United States Patent [19]

Chaix et al.

[11] Patent Number: 4,640,537
[45] Date of Patent: Feb. 3, 1987

[54] JOINING MEANS BETWEEN TWO PIPES HAVING RETRACTABLE BEARING MEMBERS

[75] Inventors: Jean-Edmond Chaix, Pierrevert; Michel Metteey, Eguilles, both of France

[73] Assignee: Commissariat a l'Energie Atomique, Paris, France

[21] Appl. No.: 817,459

[22] Filed: Jan. 9, 1986

[30] Foreign Application Priority Data

Jan. 18, 1985 [FR] France .................. 85 00722

[51] Int. Cl.⁴ .............................................. F16L 23/00
[52] U.S. Cl. .................................. 285/368; 285/332.2
[58] Field of Search ............... 285/368, 412, 364, 413, 285/408, 405, 332.2

[56] References Cited

U.S. PATENT DOCUMENTS

| | | | |
|---|---|---|---|
| 943,461 | 12/1909 | Reynolds | 285/412 |
| 1,992,485 | 2/1935 | Holmes | 285/364 X |
| 2,536,602 | 1/1951 | Goett | 285/129 |
| 2,996,318 | 8/1961 | Gravert | 285/364 X |
| 3,085,820 | 4/1963 | Pollia | 285/368 |
| 3,165,341 | 1/1965 | Burns | 285/406 |
| 3,188,115 | 6/1965 | Morrish et al. | 285/368 X |
| 3,453,010 | 7/1969 | Gerretz et al. | 285/368 |
| 3,694,007 | 9/1972 | Crow et al. | 285/368 X |
| 3,830,533 | 8/1974 | Mezei et al. | 285/364 |
| 4,341,406 | 7/1982 | Abbes et al. | 285/408 |

FOREIGN PATENT DOCUMENTS

| | | | |
|---|---|---|---|
| 2655959 | 6/1978 | Fed. Rep. of Germany | 285/368 |
| 1184262 | 2/1959 | France | |
| 2141340 | 1/1973 | France | |
| 378619 | 7/1964 | Switzerland | 285/368 |
| 393850 | 11/1965 | Switzerland | 285/368 |

Primary Examiner—Thomas F. Callaghan
Attorney, Agent, or Firm—Kerkam, Stowell, Kondracki & Clarke

[57] ABSTRACT

Joining means between two pipes, each provided with a collar having a given external diameter and able to compress a gasket between these two collars, said means having two flanges with aligned holes and an internal diameter smaller than the external diameter of the collars and tightening means traversing said holes making it possible to move the flanges together, whereby at least one of the flanges comprises an external cylindrical ring with an internal diameter larger than the external diameter of the collars and bearing parts disposed within said ring and in which are formed said holes, articulated on one lateral face of the ring, so as to be able to tilt into an overriding position in which the internal diameter of the flange substantially corresponds to the internal diameter of the ring.

9 Claims, 4 Drawing Figures

JOINING MEANS BETWEEN TWO PIPES HAVING RETRACTABLE BEARING MEMBERS

BACKGROUND OF THE INVENTION

The present invention relates to a joining means between two pipes having retractable bearing members. This invention can be used for all couplings of pipes, no matter what the shape and form of the collars.

The coupling between two pipes is of great importance in certain applications. Thus, e.g. in a steam generator, the pipes are subject to thermal and mechanical stresses, which are partly transmitted to the joining means between two consecutive pipes. Moreover, said means must ensure a reliable, tight connection within the scope of the specifications imposed (temperature, pressure, etc.).

The conventionally used joining means comprise two collars joined at the end of each pipe. These collars have in each case a shoulder, between which is placed a gasket. The shape of the shoulders depends on the joints which they are to receive. Two flanges able to bear against these shoulders have holes traversed by tightening or gripping means (bolts, tie rods, etc.). The latter exert a force serving to bring together the two flanges and compress the joint.

In the cage of such means, the flanges must be fitted on the pipes prior to the fitting of the collars at the end of the pipe, because the internal diameter of these flanges is necessarily smaller than the external diameter of the collars. For the same reason, the dismantling of the flange makes it necessary to cut the collars, which is prejudicial to the reliability of the installation and also costly.

SUMMARY OF THE INVENTION

The present invention relates to a joining means between two pipes, each of which is provided with a collar having a given external diameter and able to compress a gasket between these two collars, said means having two flanges provided with aligned holes and having an internal diameter smaller than the external diameter of the collars, so that it can bear against the latter, as well as tightening means traversing the holes formed in the flanges, so as to apply to the latter a force tending to bring them together and compress the joint between the collars, whilst making it possible to obviate the aforementioned disadvantages.

More specifically, at least one of the flanges comprises an external cylindrical ring, whose internal diameter is greater than the external diameter of the collars, as well as bearing parts placed within each ring and in which are formed the said holes, each bearing part being articulated on a lateral face of the ring, so as to be able to tilt into an overriding position, in which the internal diameter of the flange substantially corresponds to the internal diameter of the ring.

Advantageously, each bearing part is articulated on the ring about an axis arranged substantially tangentially to the internal peripheral face of the ring.

Advantageously, the bearing parts are formed from two rows of alternately arranged bearing parts, the bearing parts of the first row having lateral faces perpendicular to said axis and the bearing parts of the second row have lateral faces parallel to the lateral faces of the adjacent bearing parts of the first row.

Thus, the means according to the invention can be dismantled without necessitating the cutting of the collars and also makes it possible to use collars which are "drawn" from the mass of the pipes during the manufacture of the latter, the flanges then being positioned behind the collars following the tilting of the bearing parts over the shoulder of the collars.

Preferably, the bearing part are articulated either to the lateral face of the ring facing the other flange, or to the lateral face of the ring opposite to the other flange. Preferably, the tightening means incorporate tie rods threaded into the holes of the flanges or tie rods screwed into the holes of one of the flanges.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
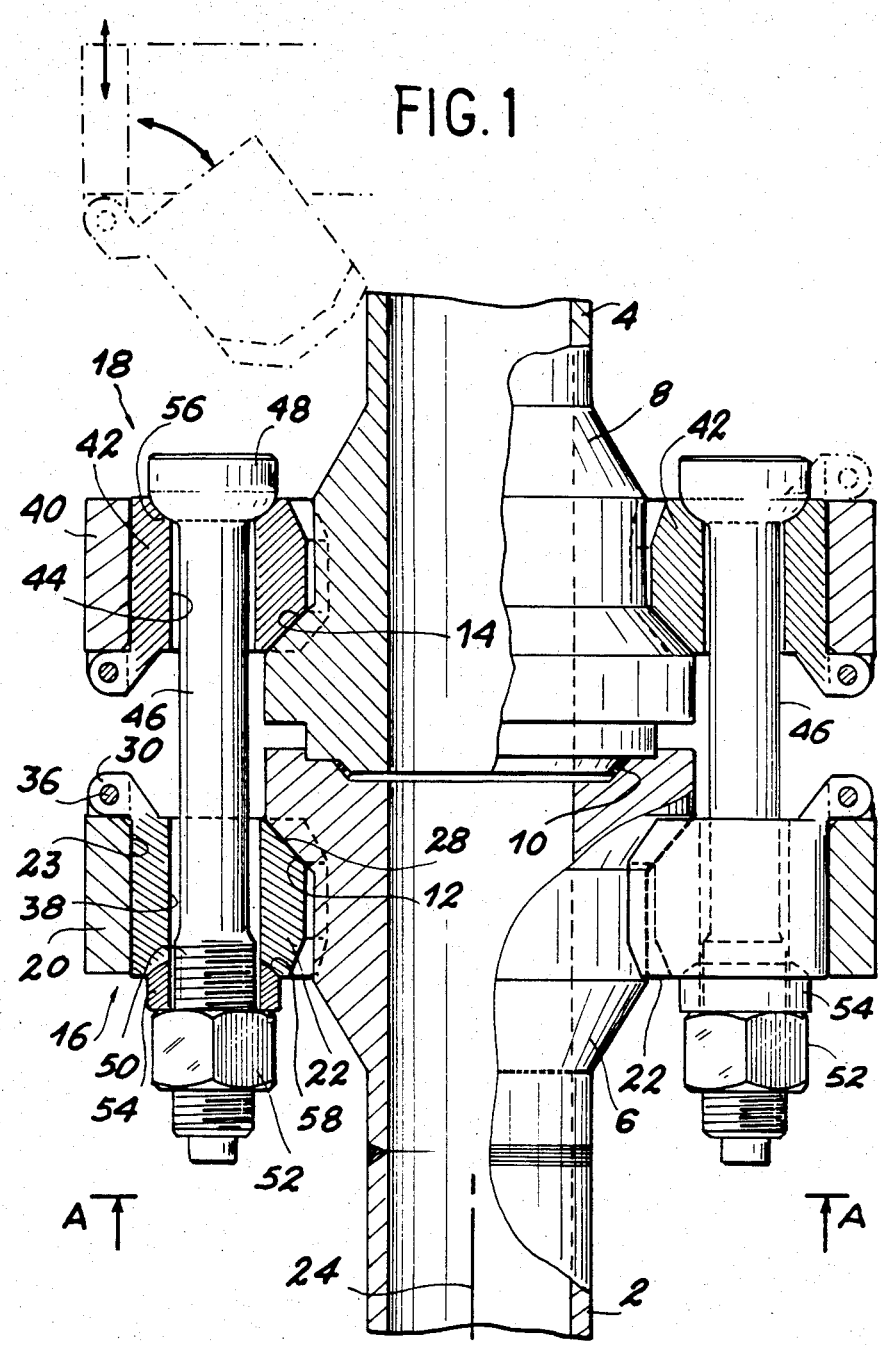
FIG. 1, in partial section, a first preferred embodiment of the means according to the invention.

The joining means according to the invention is shown in FIG. 1 according to a preferred embodiment. Said means comprises the coupling of two pipes 2,4 provided at their ends with two collars 6,8 respectively. In FIG. 1, two collar types are shown. Collar 6 is a member welded to the end of pipe 2, whereas collar 8 is "drawn" from the mass of pipe 4 during the manufacture thereof. It is obviously possible to envisage two collars welded to the ends of the pipes or two collars drawn from the mass of the pipes. The facing ends of collars 6,8 are fitted together in such a way that a gasket 10 is located between said two ends. The shape of the ends of the collars is dependent on the type of joint used, namely a "S" joint in FIG. 1.

The lateral surface of collars 6 has a frustum-shaped shoulder 12 directed towards pipe 2. Collars 8 also have a frustum-shaped shoulder 14 directed towards pipe 4. Two flanges 16,18, which can bear against shoulders 12,14 are respectively placed around collars 6,8. Flange 16 has an outer cylindrical ring 20, whose internal diameter is larger than the external diameter of collar 6.

Figure 3:
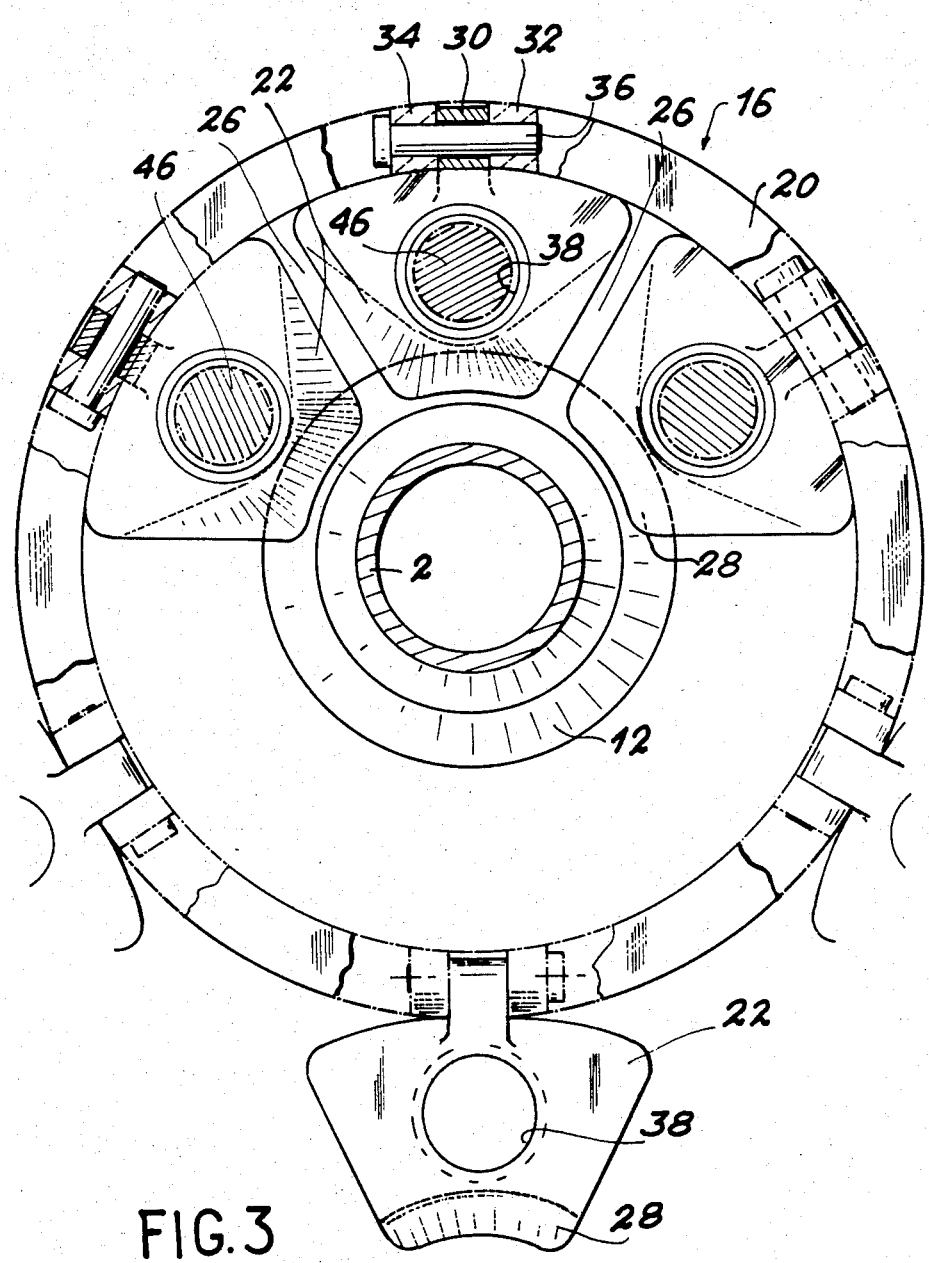
FIG. 3, in section along plane AA of FIG. 1, the flange of the means located closest to plane AA and more particularly the bearing parts and their articulation.

In FIG. 3, flange 16 is shown in accordance with the section plane AA of FIG. 1. Two bearing members 22 are positioned within ring 20. These bearing members 22 are shaped like a cylindrical sector, the radius of curvature of their outer face corresponding to the internal radius of ring 20, so that they can be applied against the inner face 23 of said ring 20. Members 22 are also cut radially with respect to an axis 24 defined by pipes 2,4 and collars 6,8 thus permit the existence of a clearance 26 between said two members 22. The inner face of bearing members 22 has a frustum-shaped shoulder 28, which can bear against the frustum-shaped shoulder 12 of collar 6.

Each of the members 22 is provided with a tongue 30 projecting on one of their lateral faces and directed towards ring 20. Tongue 30 is inserted between two caps 32,34 mounted on the corresponding lateral face of ring 20. A spindle 36 is placed in a hole made in the same alignment in the two caps 32,34 and in tongue 30. Preferably, said hole and therefore the spindle 36 are perpendicular to axis 24 and are positioned tangentially to the inner face 23 of ring 20.

The bearing members have holes 38 parallel to axis 24. Advantageously these holes 38 and tongues 30 are radially aligned with respect to axis 24.

Flange 18 is similar to the previously described flange 16. It has an outer ring 40, bearing members 42 articulated on one of the lateral faces of ring 40 and which can be applied against the shoulder 14 of the corresponding collar 8. Flange 18 has holes 44 located substantially in the same alignment with holes 38.

The aligned holes 38,44 are traversed by tie rods 46, each having at one end a head 48, which can bear against the corresponding lateral face of bearing member 42 and at the other end a threaded end piece 50. A nut 52 is screwed onto the threaded end piece 50 and bears against the corresponding lateral face of bearing member 22 via a washer 54.

Advantageously, the bearing surfaces 56,58 between head 48 and the bearing part 42 and between the washer 54 and the bearing part 22 are spherical. These bearing surfaces 56,58 associated with the clearance between holes 38,44 and the tie rods 46 make it possible to exert on the latter a purely axial stress without any risk of bending.

During the tightening of tie rods 46, the stresses are transmitted to the bearing members 22,42, then to the collars 6,8 by the cooperation of shoulders 12,14,28, which then tend to move together, whilst compressing the gasket 10. The conicity of shoulders 12,14,28 permits an automatic centring of flanges 16,18.

The bearing parts bear against the inner face 23 of rings 20,40. In order that the ring operates in pure traction and there is no stress recovery by articulations 30,32,34,36, certain clearances are necessary. A large clearance in rotation must exist between spindle 36 and caps 32,34, whereas a precise guidance in translation is necessary between tongue 30 and caps 32,34.

In FIG. 1, the joining means according to the invention is shown in the operating position, i.e. when pipes 2,4 are joined. During the fitting or dismantling of the means, flanges 16,18 can pass around collars 6,8, whilst retracting bearing members 22,24, as is partly shown in FIG. 3 (the three bearing members 22 at the bottom of FIG. 3). The bearing members tilt into an overriding position, in which the internal diameter of flanges 16,18 substantially corresponds to the internal diameter of rings 20,40, which exceeds the maximum external diameter of the collars. As shown in FIG. 3, the overriding or outer positions are radially outside of the normal inner positions (top of FIG. 3) for the bearing members 22.

Thus, this arrangement makes it advantageously possible to dismantle the flanges, in order to e.g. replace them without cutting the collars and then reweld the same.

It is also possible to use a collar drawn from the pipe mass, like collar 8 of pipe 4, for which a conventional flange is difficult to use. The fitting of the corresponding flange 18 takes place through the overriding of bearing members and then by refitting the latter. The use of a collar of this type is very advantageous with regards the overall dimensions and also obviates welds, which require long and troublesome checking, recovery, heat treatment and similar operations.

Moreover, the means according to the invention permits a distribution of stresses which is advantageous from the reliability standpoint. The bearing parts work in pure compression and the ring in pure traction, whereas the flanges of conventional means also operate in flexion, which is much less favourable.

Figure 2:
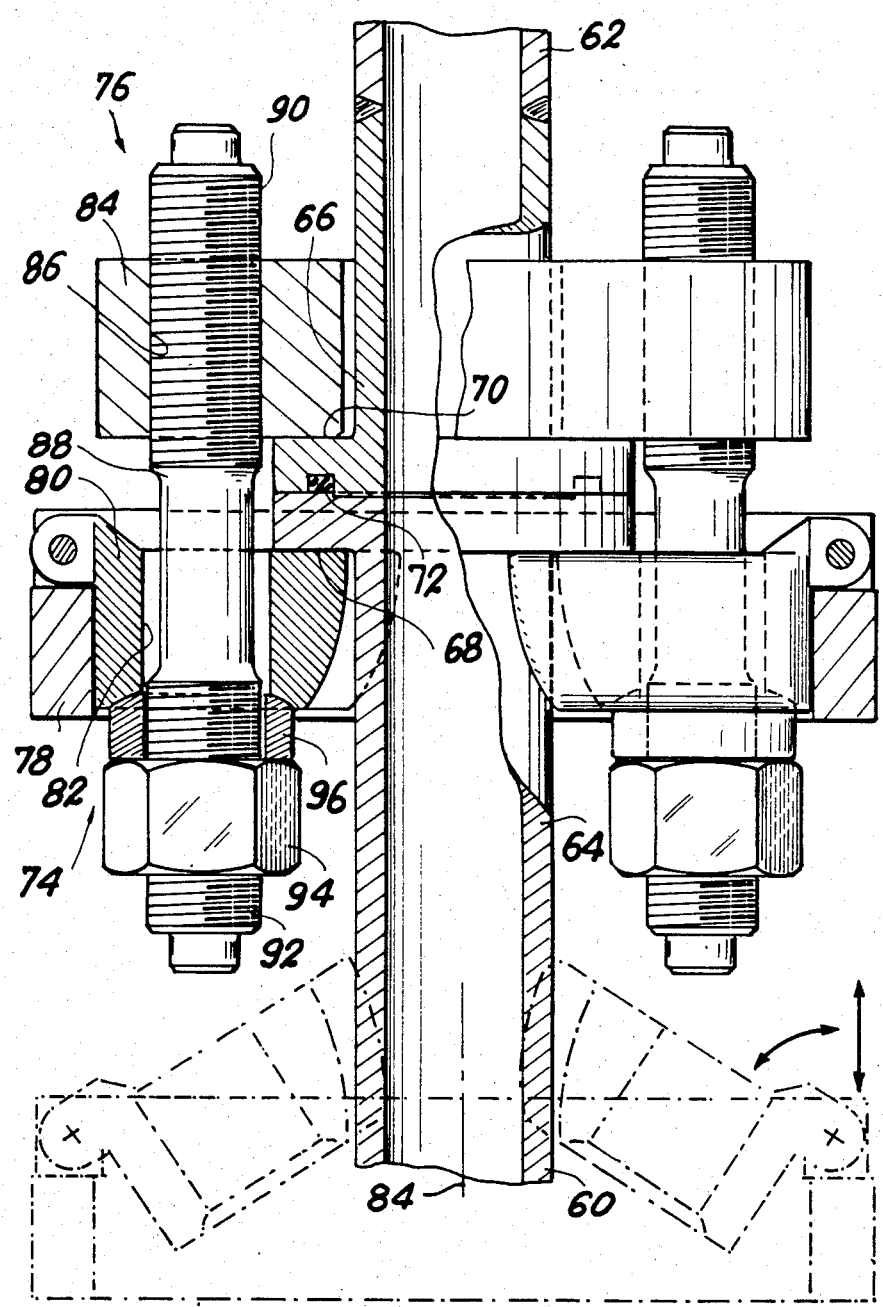
FIG. 2, in partial section, a second embodiment according to the invention.

A second embodiment of the joining means between two pipes 60,62 according to the invention is shown in FIG. 2. The ends of pipes 60,62 are provided with collars 64,66, which respectively are of conventional form and shape. Each of these collars 64,66 has a straight shoulder 68,70. The ends of collars 64,66 can move towards one another, whilst compressing an e.g. toroidal gasket 72. Two flanges 74,76, which can bear against shoulders 68,70 are positioned around the collars 64,66. Flange 74 is retractable and similar to flange 16 of FIG. 1. It has an external cylindrical ring 78 on which are articulated bearing members 80, which can bear against the shoulder 68 of collar 64 and which are perforated with holes 82 parallel to axis 84 defined by pipes 60,62 and collars 64,66.

Flange 76 is of a conventional type, i.e. it comprises a cylindrical ring 84, perforated with holes 86 aligned with the holes 82 of flange 84, able to bear against the shoulder 70 of collar 66.

The embodiment shown in FIG. 2 comprises a retractable flange 74 and a conventional flange 76, but it would obviously also be possible to use two retractable flanges 74.

Tie rods 88 are disposed in aligned holes 82.84. Hole 86 is, for example, threaded and each tie rod 88 is provided at each end with a threaded end fitting 90,92. Threaded end fitting 90 is screwed into hole 86 and a nut 94 is screwed onto fitting 92, so as to lock washer 96 against the corresponding bearing member 80. The tightening of tie rods 88 makes it possible to apply flanges 74,76 to shoulders 68,70 and compress gasket 72.

The means shown in FIG. 2 is e.g. a possible combination between a conventional flange 76 and a flange 74 according to the invention. The conventional flange then corresponds e.g. to the use of a conventional collar 66 welded to the end of pipe 62 with all the disadvantages liked with welding. A retractable flange 74 e.g. corresponds to the use of a collar 74 drawn from the mass of pipes 60. The bearing parts 80 of said flange 74 tilt into an overriding position (shown in broken line form at the bottom of FIG. 2) in which the internal diameter of flange 74 substantially corresponds to the internal diameter of ring 78, which in turn exceeds the external diameter of collar 64. The fitting and dismantling of flange 74 is therefore possible without cutting collar 64.

It is obviously possible to envisage a type of tie rod identical to that of the first embodiment (FIG. 1) or a similar type.

Figure 4:
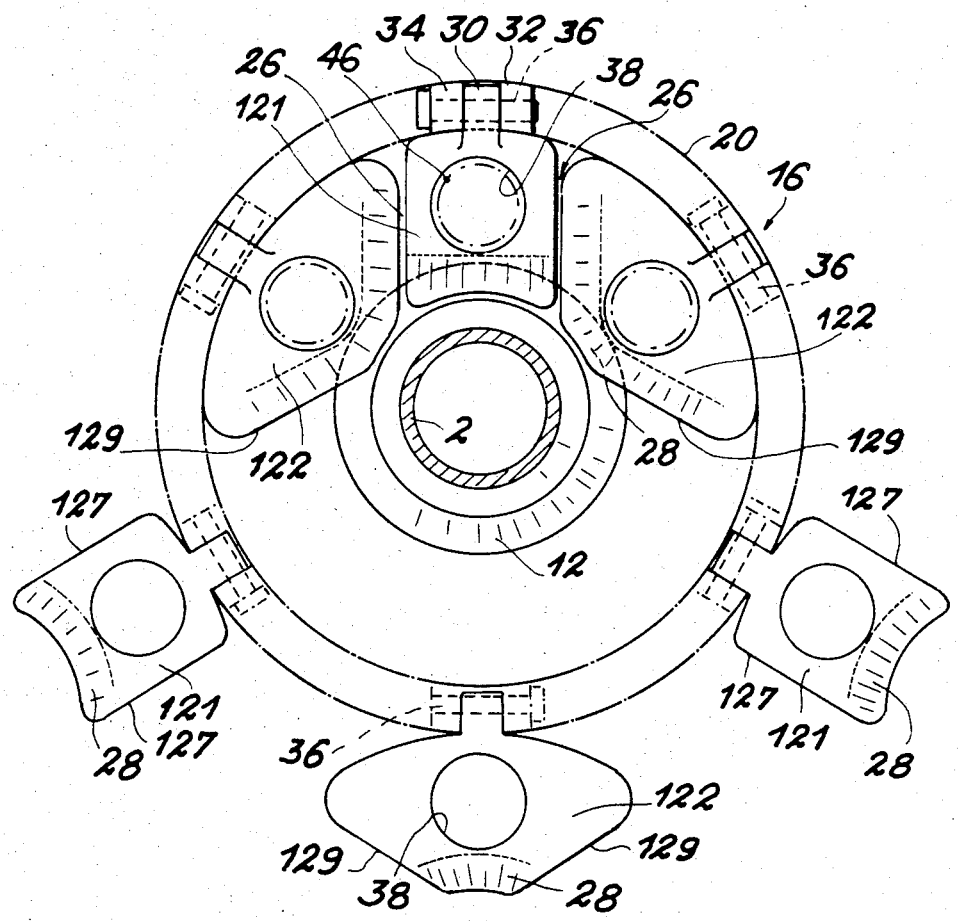
FIG. 4, a view comparable to FIG. 3 showing a constructional variant, in which the flange of the means comprises different bearing parts.

A constructional variant of the flange of the means of FIG. 3 is shown in FIG. 4. The parts or portions of the means shown in FIG. 4, which are similar to those of the means of FIG. 3 are given identical reference numerals.

Bearing parts are disposed within ring 20 of flange 16. These bearing parts are broken down into two rows of alternately arranged bearing parts. The bearing parts 121 of the first row have lateral faces 127 perpendicular to spindle 36 of articulation 30,32,34,36 described hereinbefore relative to FIG. 3. The bearing parts 122 of the second row have lateral faces 129 parallel to the lateral faces 127 of the adjacent bearing parts 121 of the first row.

By firstly tilting the bearing parts 121 of the first row, this arrangement permits a displacement of the lateral faces 127 of bearing parts 121 parallel to the lateral faces 129 of bearing parts 122. This advantageously leads to a reduction in the clearance between the bearing parts.

Tie rods 46 are threaded into holes 38 of bearing parts 121,122, in the same way as for the means of FIG. 3. Obviously the above description is only given in an exemplified manner and numerous variants thereof are possible without passing beyond the scope of the invention. Thus, it is e.g. possible to envisage collar types which differ widely as a function of the operating conditions, as well as the corresponding flanges and gaskets used. It is possible to consider welded collars or collars drawn from the mass.

The articulations 30,32,34,36 of the bearing parts can be located on any one of the lateral faces of the flanges. An articulation arranged on the pipe side is shown in mixed line form in FIG. 1.

What is claimed is:

1. A joining means between two pipes, each of which is provided with a collar having a given external diameter and able to compress a gasket between these two collars, said means having two flanges perforated with aligned holes and having an internal diameter smaller than the external diameter of the collars, so as to be able to bear against the latter, as well as tightening means traversing the holes formed in the flanges in order to apply thereto a force tending to move them together and compress the gasket between the collars, wherein at least one of said flanges is an assembly comprising an external cylindrical ring having an internal diameter larger than the external diameter of the collars and bearing parts positioned in an inner position within said ring and in which are formed said holes, each bearing part being articulated on a lateral face of the ring, so as to be able to tilt into an outer position in which the internal diameter of the assembly substantially corresponding to the internal diameter of the ring.

2. A means according to claim 1, wherein each bearing part is articulated on the ring about a spindle arranged substantially tangentially to the internal peripheral face of the ring.

3. A means according to claim 2, wherein the bearing parts are formed from two rows of alternately arranged bearing parts, the bearing parts of the first row having lateral faces perpendicular to said spindle and the bearing parts of the second row have lateral faces parallel to the lateral faces of the adjacent bearing parts of the first row.

4. A means according to claim 1, wherein the bearing parts are articulated on the lateral face of the ring of one flange facing the other flange.

5. A means according to claim 1, wherein the bearing parts are articulated on the lateral face of the ring of one flange opposite to the other flange.

6. A means according to claim 1, wherein said tightening means incorporate tie rods formed from a cylindrical rod provided with a head, which can bear on one of the flanges and a threaded end fitting onto which is screwed a nut, a washer being inserted between said nut and the other flange.

7. A means according to claim 6, wherein the bearing surfaces of the head and the washer on the respective flanges are spherical.

8. A means according to claim 1, wherein at least one of the same holes of one of the flanges is threaded and the corresponding tightening means comprises a rod which is threaded at both ends, one of the ends being screwed into the threaded holes, a nut being screwed onto the other end and a washer being inserted between said nut and the corresponding other flange.

9. A means according to claim 8, wherein the bearing surface between the washer and the corresponding flange is spherical.

* * * * *